(12) United States Patent
Tuschel et al.

(10) Patent No.: US 7,815,117 B2
(45) Date of Patent: *Oct. 19, 2010

(54) METHOD AND APPARATUS FOR COUNTERFEITING PROTECTION

(75) Inventors: David Tuschel, Monroeville, PA (US); Wesley H. Hutchison, Bridgeville, PA (US); Thomas C. Voigt, Export, PA (US)

(73) Assignee: ChemImage Corporation, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/641,671

(22) Filed: Dec. 20, 2006

(65) Prior Publication Data

US 2007/0241177 A1  Oct. 18, 2007

Related U.S. Application Data

(60) Provisional application No. 60/754,324, filed on Dec. 29, 2005, provisional application No. 60/777,852, filed on Mar. 1, 2006, provisional application No. 60/784,042, filed on Mar. 20, 2006.

(51) Int. Cl.
*G06K 15/00* (2006.01)
*G06F 19/00* (2006.01)
*G06Q 30/00* (2006.01)

(52) U.S. Cl. .................. 235/462.01; 235/375; 235/383; 235/385; 235/462.08; 235/462.09; 235/462.25; 382/103; 382/141; 382/143

(58) Field of Classification Search .................. 235/382, 235/385, 375, 383, 462.01, 462.08, 462.09, 235/462.25; 382/103, 141, 143
See application file for complete search history.

(56) References Cited

U.S. PATENT DOCUMENTS 5,592,561 A * 1/1997 Moore ........................ 382/103
5,777,314 A   7/1998 Roustaei (Continued)

FOREIGN PATENT DOCUMENTS

GB    2307762    6/1997

(Continued)

OTHER PUBLICATIONS

Janie Dubois, Jean-Claude Wolff, John K. Warranck, Joseph Schoppelrei, and E. Neil Lewis, "NIR Chemical Imaging for Counterfeit Pharmaceutical Products Analysis", Spectroscopy 22(2), Feb. 2007, pp. 40-50.

(Continued)

*Primary Examiner*—Thien Minh Le
*Assistant Examiner*—Tuyen K Vo
(74) *Attorney, Agent, or Firm*—Duane Morris LLP

(57) ABSTRACT

The disclosure relates generally to methods and apparatus for protecting against counterfeit products and for methods and apparatus for providing counterfeiting protection for an object. In one embodiment, the method includes the steps of: (a) accessing an object including an identifying mark having a first portion and a second portion wherein said second portion includes an encrypted feature; (b) reading the first portion to thereby obtain a first set of information; (c) transmitting the first set of information to a remote location; (d) receiving from the remote location a second set of information; and (e) reading the second portion using the second set of information to thereby determine the authenticity of the object.

50 Claims, 8 Drawing Sheets

U.S. PATENT DOCUMENTS

| | | | |
|---|---|---|---|
| 5,959,285 | A | 9/1999 | Schuessler |
| 6,100,967 | A | 8/2000 | Farrer et al. |
| 6,543,692 | B1 | 4/2003 | Nellhaus et al. |
| 6,610,351 | B2 | 8/2003 | Shchegolikhin et al. |
| 6,771,369 | B2 | 8/2004 | Rzasa et al. |
| 2003/0039195 | A1 | 2/2003 | Long et al. |
| 2004/0023397 | A1* | 2/2004 | Vig et al. ............... 436/1 |
| 2004/0125988 | A1* | 7/2004 | Coetzee et al. ........... 382/112 |
| 2004/0182928 | A1 | 9/2004 | Ehrhart et al. |
| 2005/0010776 | A1 | 1/2005 | Kenen et al. |
| 2005/0040240 | A1 | 2/2005 | Jones et al. |
| 2005/0199724 | A1 | 9/2005 | Lubow |
| 2005/0260465 | A1 | 11/2005 | Harris |
| 2006/0091208 | A1* | 5/2006 | He et al. ............... 235/385 |
| 2006/0209301 | A1* | 9/2006 | Gardner et al. ........... 356/301 |
| 2007/0051816 | A1* | 3/2007 | Chu ..................... 235/492 |
| 2007/0131772 | A1* | 6/2007 | Lubow ................. 235/462.01 |

FOREIGN PATENT DOCUMENTS

| | | |
|---|---|---|
| JP | 2001319197 | 11/2001 |
| JP | 2005284412 | 10/2005 |
| KR | 20010088904 | 9/2001 |
| WO | 2004072868 A1 | 8/2004 |

OTHER PUBLICATIONS

Dr. William Coyle, "Anti-Counterfeiting Drug Initiative: Fluorescent Materials," Angstrom Technologies, Inc., Oct. 8, 2003, pp. 1-4.

Charlotte Eliasson and Pavel Matousek, "Noninvasive Authentication of Pharmaceutical Products through Packaging Using Spatially Offset Raman Spectroscopy," Analytical Chemistry, Feb. 15, 2007, vol. 7, No. 4, pp. 1696-1701.

"DataLase Revolutionary Techniques for Marketing Products & Protecting Brands," DataLase, Inc., 2006, p. 1.

DataLase Revolutionary Techniques for Marketing Products & Protecting Brands, DataLase PHARMAMARK, pp. 1-2.

"Precision Solutions From Light—Drug Verification System-RxSpec," Analytical Spectral Devices, Inc., 2004, pp. 1-2.

"Anti-Counterfeit Drug Initiative—Public Meeting," (http://www.fda.gov/oc/initiatives/counterfeit/oct2003meeting/pan), Oct. 2003,. pp. 1-2.

IDGLOBAL, Anti-Counterfeiting, pp. 1-5.

Authentix, Global Leaders in Authentication, "Nano-solutions for Global Issues-together we make a differences," pp. 1-8.

Orbid, Orbid Products, http://www.orbidecorp.com/products/index.php, pp. 1-16.

http://www.uidsupport.com/related_techno/id_trace.htm (and Keymaster technologies discussed through links on this Siemens website.

"Large order of instruments to be used in determination of fake and substandard drugs in the Chinese open market," Bruker Optic reaches an agreement with the China's State Food and Drug Administration Department, Jan. 19, 2006.

http://www.datalase.conn/products_pharmamark.asp.

Adhesives research, http://www.adhesivesresearch.com/content/blogsection/8/122/.

http://graphics.kodak.com/global/product/security_authentication/traceless/.

http://www.orbidcorp.com/products/2DMI_pharma.php.

http://datamonitor-market-research.com/Merchant2/merchant.mvc?Store_Code=RESEARCH&AFFIL=svpg2222&Screen=PROD&Product_Code=rbhc0133).

International Searching Authority, International Search Report for International application No. PCT/ US06/49371 (cross-referenced foreign application), Date of Mailing: Apr. 30, 2008, Form PCT/ISA/220 & Form PCT/ISA/210 (sheet one and sheet two).

International Searching Authority, International Search Report for International application No. PCT/US06/48378 (counterpart foreign application), Date of Mailing: Mar. 19, 2008, Date of Receipt: Mar. 24, 2008, Form PCT/ISA/220 & Form PCT/ISA/210 (sheet one and sheet two).

International Searching Authority, International Search Report for International application No. PCT/US06/48380 (cross-referenced foreign application), Date of Mailing: Feb. 12, 2008, Date of Receipt: Feb. 14, 2008, Form PCT/ISA/220 & Form PCT/ISA/210 (sheet one and sheet two).

International Searching Authority, International Search Report for International application No. PCT/US06/48379 (cross-referenced foreign application), Date of Mailing: Mar. 19, 2008, Date of Receipt: Mar. 24, 2008, Form PCT/ISA/220 & Form PCT/ISA/210 (sheet one and sheet two).

International Searching Authority, International Search Report for International application No. PCT/US06/48381 (cross-referenced foreign application), Date of Mailing: Feb. 26, 2008, Date of Receipt: Feb. 28, 2008, Form PCT/ISA/220 & Form PCT/ISA/210 (sheet one and sheet two).

* cited by examiner

METHOD AND APPARATUS FOR COUNTERFEITING PROTECTION

PRIORITY INFORMATION

The instant disclosure claims the filing-date benefit of Provisional Application No. 60/754,324 filed Dec. 29, 2005 (entitled "System and method for anti-counterfeiting using chemical imaging"), Provisional Application No. 60/777,852, filed Mar. 1, 2006 (entitled: "Anti-counterfeiting business model"), and Provisional Application No. 60/784,042 filed Mar. 20, 2006 (entitled: "Two- and Three-Dimensional Bar Codes with Invisible Encryptions"). The disclosure of each of these applications is incorporated herein in its entirety.

CROSS-REFERENCES TO RELATED APPLICATIONS

Cross-reference is made to the following related U.S. application Ser. Nos. 11/641,666; 11/641,669; 11/641,668; and 11/641,667 all filed concurrently herewith and entitled "Method and Apparatus for Counterfeiting Protection" and which are also incorporated herein by reference in their entirety.

BACKGROUND

Counterfeiting is on the rise. The accessibility of production markets with little or no regulation and low labor cost coupled with demand for inexpensive product provides a strong market for counterfeit products. While all counterfeit products adversely effect the bona fide manufacturers' profitability, certain counterfeit goods can have an adverse, if not fatal, effect on the consumer's health. For example, a counterfeit medicinal product can have a fatal effect on a patient's health if it includes inappropriate dosage of the active ingredient.

More recently, counterfeit drugs and medicinal products have entered the market through direct email to potential consumers. Advertisements for popular pharmaceutical products such as Lipitor®, Viagra® and Ambien® are ubiquitous. Counterfeiters take advantage of the popularity of these products and send direct emails to potential consumers who may wish to self-prescribe or obtain the product at a lower price. While this type of counterfeiting is a problem, what is much more troubling is the fact that counterfeiters are now infiltrating the supply chain that exists between the manufacturer and the distribution point to the consumer, such as a neighborhood pharmacy. Counterfeiters who insert their counterfeit products into the supply chain can do so by, for example, reproducing the existing markings (e.g., barcodes, visible security markings, lot numbers, etc.) on a product or the package for a product then introducing their counterfeit products with the reproduced markings in the supply chain at a supply chain node, such as a distributor's warehouse. Consequently, unsuspecting and unwitting doctors, pharmacists, and consumers who think that they are prescribing, distributing, and consuming authentic products are actually being duped into dealing with counterfeit products. This method of counterfeiting is especially insidious and dangerous and has the potential to ruin the trust doctors, pharmacists, and consumers have in the products that are being prescribed let alone the harm caused to the consumer by consuming products that are potentially harmful. Furthermore, counterfeiting by placing fraudulent products that are seemingly real into the supply chain for authentic products is in no way limited to drugs and medical products. Rather, this counterfeiting procedure can be replicated in just about any product supply chain. Thus, the potential for harm due to supply chain counterfeiting is enormous.

While bona fide manufacturers incorporate various means, such as bar codes, to verify a product's authenticity, sophisticated counterfeiters are able to match most such identifications. For example, one-dimensional bar codes have been conventionally printed on the product's packaging. Such barcodes have been readily and accurately reproduced on the counterfeit product's packaging. Similarly, product markings which often appear on the ingestible solid medications such as tablets and capsules are readily and accurately reproduced in the counterfeit product. Additionally, while counterfeit drugs and medical products are often sold directly to the consumer, a portion of such products can find its way to regular distribution channels such as pharmacies, clinics and hospitals. These distribution channels have a responsibility to provide authentic products and would face substantial liabilities should they dispense a counterfeit product. Accordingly, there is a need for a method and apparatus for providing protection against counterfeit products.

SUMMARY OF THE DISCLOSURE

In an embodiment, the disclosure relates to a method for providing counterfeiting protection for an object, comprising the steps of: (a) affixing to an object an identifying mark having a first portion and a second portion wherein said second portion includes an encrypted feature; (b) reading the first portion to thereby obtain a first set of information; (c) transmitting the first set of information to a remote location; (d) receiving from the remote location a second set of information; and (e) reading the second portion using the second set of information to thereby determine the authenticity of the object.

In another embodiment, the disclosure relates to an improved method for providing counterfeiting protection for an object including the steps of: affixing an identifying mark on the object and reading the identifying mark at a distribution point for the object, and the improvement comprising: affixing a feature on the object wherein the feature is encrypted according to a predetermined encryption method comprising obtaining from a remote location a first set of information to direct the affixing of the feature on the object; and obtaining from the remote location a second set of information for reading the feature.

In yet another embodiment, the disclosure relates to a method for providing counterfeiting protection for an object, comprising the steps of: (a) accessing an object including an identifying mark having a first portion and a second portion wherein said second portion includes an encrypted feature; (b) reading the first portion to thereby obtain a first set of information; (c) transmitting the first set of information to a remote location; (d) receiving from the remote location a second set of information; and (e) reading the second portion using the second set of information to thereby determine the authenticity of the object.

In still another embodiment, the disclosure relates to a method for determining authenticity of an object, comprising: reading an identifying mark on an object; determining if the identifying mark includes a first portion and a second portion; determining if the second portion includes a feature encrypted according to a predetermined encryption method; indicating a lack of authenticity of the object upon the occurrence of one or more of the following: an absence of said first portion on said object, an absence of said second portion on said object, or an absence of said feature encrypted according to the predetermined encryption method on said object; and indicating authenticity of the object upon the occurrence of all of the following: a determination that said first portion is on said object, a determination that said second portion is on said object, and the determination that said feature encrypted according to the predetermined encryption method is on said object.

In a further embodiment, the disclosure relates to an object comprising: an identifying mark affixed to said object; said identifying mark having an identifier feature including at least one of: the object's designation, the object's type, the object's batch number, location of manufacture, date of manufacture, time of manufacture, date of expiration, and at least one of the object's ingredients; and said identifying mark having an encrypted feature with an attribute chosen from the group consisting of: shape, size, dimensionality, material, location on the object, and spectral fingerprint.

In another further embodiment, the disclosure relates to a system for providing counterfeiting protection for an object, comprising: an affixer for affixing to an object an identifying mark having a first portion and a second portion wherein said second portion includes an encrypted feature; a first reading device for reading the first portion to thereby obtain a first set of information; a transmitter for transmitting the first set of information to a remote location; a receiver for receiving from the remote location a second set of information; and a second reading device for reading the second portion using the second set of information to thereby determine the authenticity of the object.

In an improvement according to yet a further embodiment, the disclosure relates to a system for providing counterfeiting protection for an object where the system includes a writing device for placing an identifying mark on the object and a reading device for reading the identifying mark at a distribution point for the object, and the improvement comprising: said writing device further comprising circuitry for receiving a first set of information from a remote location and an affixer for placing an encrypted feature on said object as a function of said first set of information; and said reading device further comprising circuitry for receiving a second set of information from said remote location wherein said second set of information includes instructions for the reading device to read said encrypted feature.

In an improvement according to still a further embodiment, the disclosure relates to generating an encrypted feature at a remote location, requiring a manufacturer to access the remote location during manufacture of an object so as to receive data pertaining to the encrypted feature therefrom to be included as part of an identifying mark placed on the object, and requiring an operator at a distribution point to access the remote location during reading of the identifying mark so as to send data pertaining to the encryption feature to the remote location, thereby enabling the remote location to ascertain authenticity of the object at the distribution point.

In another embodiment, the disclosure relates to an apparatus and method for receiving an object having an identifying mark, locating the identifying mark associated with the object and place the identifying mark in proximity to a reading device, reading the identifying mark with the reading device to determine whether the identifying mark includes a first portion, when the identifying mark includes the first portion, reading the first portion to thereby obtain a first set of information, transmitting the first set of information to a remote location, determining at the remote location a second set of information based on the received first set of information, receiving from the remote location the second set of information, using the second set of information, optically investigating the identifying mark to determine whether the identifying mark includes a second portion, when the identifying mark includes the second portion, reading the second portion with the reading device to thereby obtain a third set of information, transmitting the third set of information to the remote location, and using the third set of information, determining at the remote location whether the second portion includes a feature encrypted according to a pre-determined method and verifying at the remote location authenticity of the encrypted feature if determined to be present in the second portion.

In still another embodiment, the disclosures relates to an apparatus configured to receive a first request from a manufacturer of a product desirous of preventing counterfeiting of the product, generate an encrypted feature for the product, and send the encrypted feature to the manufacturer without making the content of the encrypted feature known to the manufacturer, wherein the encrypted feature is to be included as part of an identification mark to be placed on the product during manufacture thereof.

BRIEF DESCRIPTION OF THE DRAWINGS

These and other embodiments of the disclosure will be described with reference to the following drawings, in which.

DETAILED DESCRIPTION

Figure 1A:
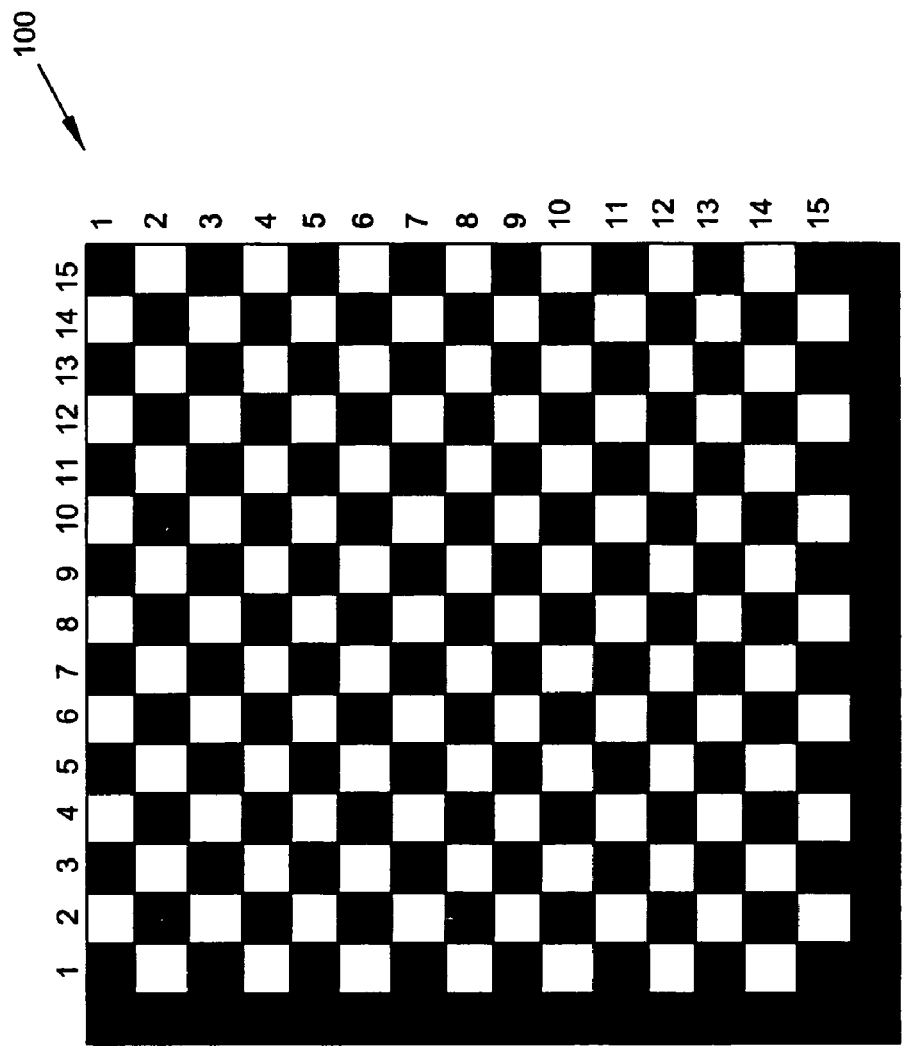
FIG. 1A is a schematic representation of a conventional 2D barcode.

FIG. 1A is a schematic representation of a conventional two-dimensional (2D) barcode. In FIG. 1A, barcode 100 is a 2D barcode having a vertical dimension and a horizontal dimension. Each of the horizontal and the vertical dimensions of barcode 100 include rows 1-15 and column 1-15. Information can be encoded and stored in each of the two dimensions of barcode 100. Conventional barcodes include information such as the product's manufacturing date, manufacturing location, batch number, etc. The barcode information (or other identifying marks) can be placed on the product and/or its packaging.

Because conventional barcodes can be easily replicated by counterfeiters, in one embodiment of the disclosure a barcode may contain encrypted information (or an encryption feature) in addition to the conventional information. The encrypted feature or features can be configured to be invisible to the naked eye or to the conventional barcode scanners. That is, the encrypted feature can be invisible to scanners tuned to a conventional wavelength. Alternatively, the encrypted feature can be viewed by the conventional scanner but not be deciphered or decoded. Thus, even if the counterfeiter can obtain the scanner, the counterfeiter would still fail to replicate the content of the encrypted feature. It is noted here that the terms "encrypted feature", "encryption feature", "encrypted portion", "encryption portion" or other such similar terms are used interchangeably herein.

Figure 1C:
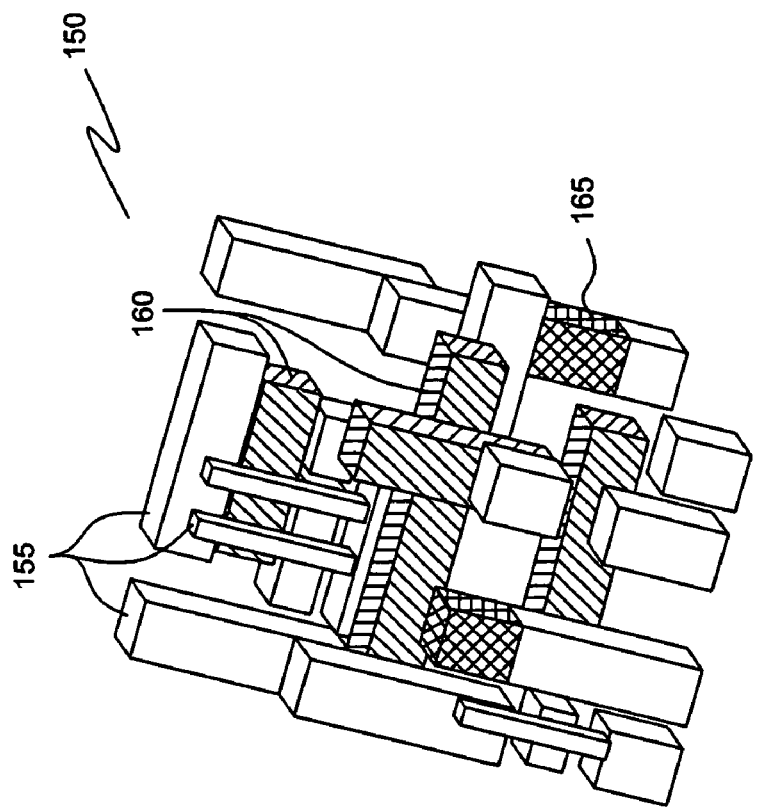
FIG. 1C is an exemplary 3D barcode system according to one embodiment of the disclosure.
Figure 1B:
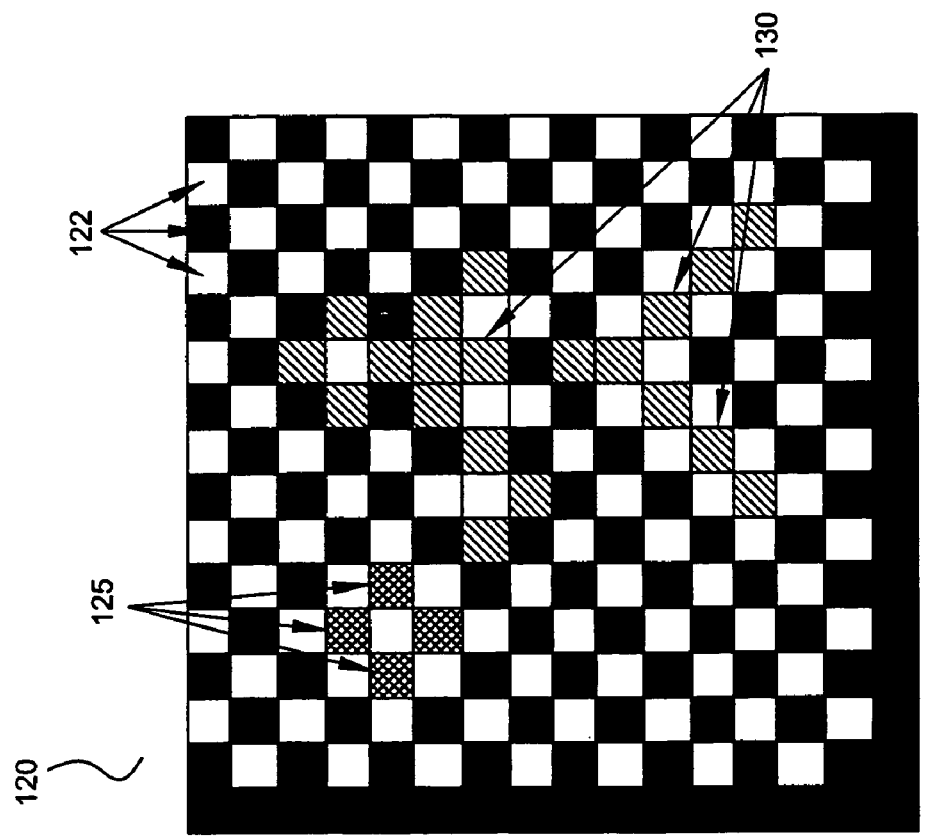
FIG. 1B is an exemplary 2D barcode system according to one embodiment of the disclosure.

FIG. 1B is an exemplary barcode system according to one embodiment of the disclosure. In FIG. 1B, barcode 120 represents a 2D barcode, similar to the barcode of FIG. 1A, having vertical rows 1-15 and horizontal rows 1-15 (not marked for brevity). The vertical and horizontal rows can contain information as in the conventional 2D barcodes. According to one embodiment of the disclosure, barcode 120 can be supplemented with encrypted information. For example, the cross-hatched region 125 in FIG. 1B may be printed with Raman-scattering material or fluorescent material such that region 125 would not be visible at the visual wavelength range and/or with a reader that is not adapted to read Raman-scattered photons or fluorescent photons. Similarly, hatched region 130 may be printed with a Raman-scattering material or fluorescent material having a different wavelength or spectral fingerprint (a non-limiting example of which may be a particular intensity or energy distribution over a particular wavelength range) than that of the cross-hatched region 125. Thus, the different hatching in FIG. 1B can denote different wavelengths. Each of regions 125 and 130 can contain additional product information. Because regions 125 and 130 are not visible to the naked eye or to a conventional barcode scanner, a counterfeiter may not readily copy these regions.

Further, regions 125 and 130 can be encrypted with information such as authentication information whose decoding would require a cipher only known to an independent authentication center. Encoded regions 125 and 130 can also be configured to form a watermark, a logo, or other symbols such that once visible it can authenticate the product.

According to one embodiment of the disclosure, barcode 120 may comprise a first region 122, a second region 125 and/or a third region 130. First region 122 can provide a first set of information which can lead to reading or decoding the second region 125 and/or third region 130. For example, the first set of information can direct the reader to an authentication center for providing decoding information for second region 125 and/or third region 130. The first set of information can also provide certain parameters for reading one or both of second region 125 and third region 130. Such parameters may include, location, orientation or an attribute of the second and/or third regions. The attributes of the encoded regions can include, shape, size, dimensionality, material, spectral fingerprint and encryption feature(s).

Thus, an embodiment of the disclosure relates to the placement of an identifying mark having a first portion and a second portion. The identifying mark can be a 1D barcode, 2D barcode, a 3D barcode, a data matrix or a combination thereof. The identifying mark can be in color or in back and white. The first portion of the identifying mark can comprise an object identifier such as a barcode. The second portion of the identifying mark can comprise an independent object identifier or it may be part of the first portion's object identifier. The second portion may be encrypted to contain additional data not accessible to the counterfeiter. The encrypted features may be invisible to the naked eye or to the conventional barcode scanners. The encrypted features may also be unknown to the product's manufacturer and/or its distributor (i.e., the writing device used to place the identifying mark on the object may be a mere conduit for placing the identifying mark on the object as directed by a control or information or authentication center while the writing device may not have hardware and/or software for generating and/or storing the particulars of the identifying mark; similarly the reading device used to read the identifying mark may be a mere conduit for reading the identifying mark as directed by the control/information center while the reading device may not have hardware and/or software for storing the particulars of the identifying mark apart from the reading process). The first portion may include information pertaining to decoding the encryption of the second portion. Thus, the scanner may read the first portion and obtain a first set of information (based on, for example, a visible symbol including, but not limited to, a number, a letter, an alpha-numeric symbol, a geometric symbol, or any other symbol). The first set of information may be then communicated to a control/information/authentication center which would respond by providing a second set of information to the scanner. Using the second set of information, the scanner or another reading device may read the encrypted feature(s) and send a third set of information to the control/information/authentication center (or a separate authentication center) where the third set of information is based on the content of the encrypted feature(s). The control/information/authentication center, or the separate authentication center, may use the third set of information to determine the authenticity of the object.

As a non-limiting example, the second set of information may comprise wavelength information for reading the second portion where reading the second portion includes illuminating the second portion with photons of a predetermined wavelength. The illumination may be performed using a laser. The predetermined wavelength may be in the range of near infrared light, infrared light, visible light, and ultraviolet light. In another embodiment, reading the second portion may include forming a spatially accurate wavelength-resolved image of the second portion showing a first and a second spatial dimension. A spatially accurate wavelength-resolved image is an image of a sample that is formed from multiple "frames" wherein each frame has plural spatial dimensions and is created from photons of a particular wavelength (or wave number) or from photons in a particular wavelength band (or wave number band) so that the frames may be combined to form a complete image across all wavelengths (wave numbers) of interest. The second set of information may include spatial information (e.g., where on the object the scanner/reader is to look for the encrypted feature), temporal information (e.g., time intervals for the scanner/reader to illuminate and read the encrypted information), and/or energy information (e.g., at what intensity and/or wavelength the scanner/reader should illuminate the encrypted feature).

FIG. 1C is an exemplary 3D barcode system according to one embodiment of the disclosure. In FIG. 1C, barcode 150 contains information in three dimensions. As in FIG. 1B, barcode 150 can be an identifying mark having a first portion and a second portion. The first portion can be defined, for example, by region 155 which can be detectable to conventional scanners. The second portion of barcode 150 can comprise, for example, regions 160 and/or 165. For illustration purposes, each of regions 160 and 165 is shown with hatching or cross-hatching. It should be noted, however, that regions 160 and 165 can be encoded such that they are not visible at the visual wavelength range. Thus, a scanner can read the first portion (i.e., region 155) to obtain a first set of information. The first set of information can be used to read one or both of the second region 160 and/or third region 165. Such information may include one or more parameters for reading the second region 160. In one embodiment, the first set of information comprises product identification information which can be communicated to the authentication center to obtain one or more parameters required for reading the second and/or third regions.

The identifying mark may include a second portion with spectral features undetectable to the naked eye or to the conventional barcode scanner. For example, the encrypted feature of the identifying mark may be encoded into or along side the mark using a fluorescent material having a predetermined spectral fingerprint. The spectral fingerprint can be determined by the authentication center on an a priori, random or quasi-random basis. The fluorescent material and/or spectral fingerprints may vary from one batch to another or from one product to another. Products within the same package may even have different spectral fingerprints. The second portion may be positioned within or outside of the first portion of the mark. The authentication center can determine timing, placement, location, shape and the content of the second portion. The authentication center can comprise a remote facility or a third-party facility which operates independently of the manufacturer and/or the distribution center, i.e., the manufacturer and/or the distribution center may not be aware of the details, or sometimes even the existence, of the second portion of the mark or an encrypted feature of the mark. In an alternative embodiment, e.g., in a corporate environment, the remote facility may be an entity affiliated with the manufacturer or a subsidiary or any other entity owned or operated by the manufacturer.

Figure 2:
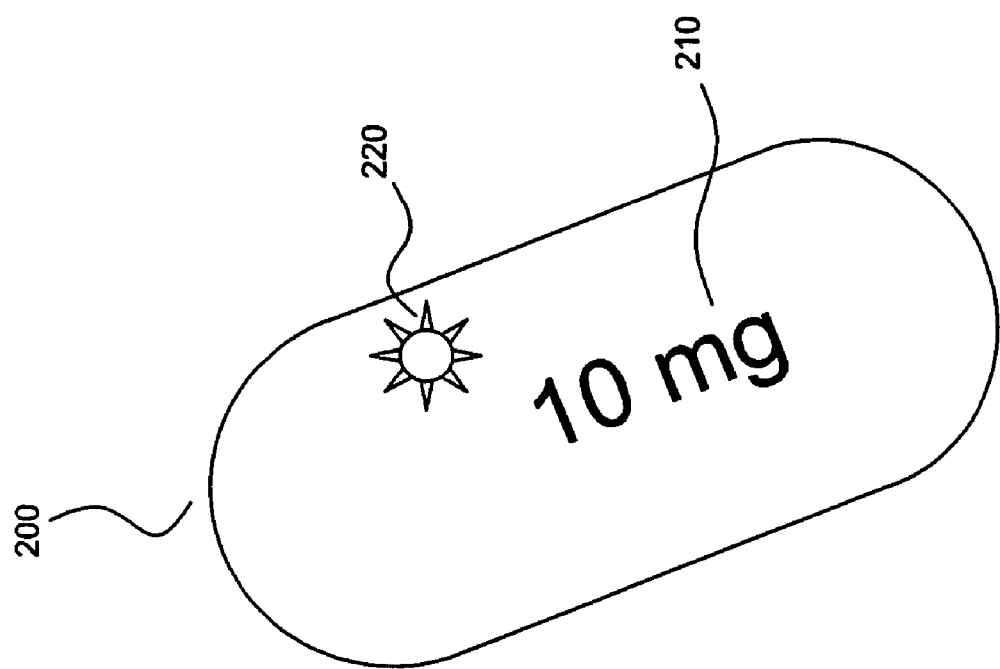
FIG. 2 is an exemplary representation of a pharmaceutical capsule with an identifying product mark according to one embodiment of the disclosure.

FIG. 2 is an exemplary representation of a pharmaceutical capsule with an identifying product mark according to one embodiment of the disclosure. In FIG. 2, capsule 200 contains medicament. Standard production information, such as the amount of active pharmaceutical ingredient (API) 210, is printed on capsule 200. The information may be printed using acceptable food coloring or it may be embossed as an impression on capsule 200, or any other method known in the art. Additional identification 220 is also provided on capsule 200. While for illustration purposes identification 220 is a visible mark, it should be noted that such identification can be made invisible according to the principles disclosed herein.

The identifying mark 220 can include an encrypted feature therein. In another embodiment, the identifying mark can contain information to direct the reader to a coordinate on the product that contains the encrypted feature. In still another embodiment, either the visible portion or the invisible portion of the identifying mark may function as a reference frame for a coordinate system that facilitates detection in an orientation-independent manner. The identifying mark may also include additional identification criteria as well as information for contacting the authentication center.

The encrypted feature (alternatively, the second portion of the identifying mark) may be printed on the product using spectral fingerprints which cannot be detected with the naked eye or with conventional scanning devices without a priori knowledge of its spectral fingerprint. The second portion may include a parameter that is a function of its location on the product, its orientation with respect to the product or an attribute thereof. The attribute of the second portion may include shape, size, dimensionality, material, spectral fingerprint and encryption feature. While the illustrative examples provided herein disclose an identifying feature having a first visible portion and a second portion not visible to the naked eye, the principles disclosed herein are not limited thereto. Indeed, in an embodiment of the disclosure, the entire identifying mark may be invisible at the visual wavelength range and to a scanner not configured with the spectral fingerprint of the identifying mark.

In another embodiment, the identifying mark or the encryption portion thereof may contain fluorescent material having a specific spectral signature determined by an authentication center. The encryption portion may even contain more than one type of fluorescent material or a single type of fluorescent material having different spectral fingerprints at different locations within the identifying mark. For example, a barcode may be used having two different colors, each color identifying a different spectral fingerprint. Similarly, the encryption portion may comprise one or more Raman-scattering material. In such cases, authenticity may be determined on the basis of one or more of the wavelengths emitted from the fluorescent material, the wavelength of the Raman-scattering from the Raman-scattering material, an intensity of emission the fluorescent material, an intensity of emission from the fluorescent material, an intensity of the Raman-scattering material or a chemical image of the second portion.

An apparatus according to one embodiment of the disclosure may include a scanner or a reading device configured to detect the authentication center's spectral signature after the spectral signature has been revealed. The size and shape of the identifying mark 220 may be over one centimeter in length or smaller (microscopic), e.g., such as approximately 1 micrometer or even smaller. Conventional printing methods, such as inkjet printing, photolithography, two-photon writing, embossing, engraving and stamping can be used to print the identifying mark on the product and/or its packaging.

Figure 3:
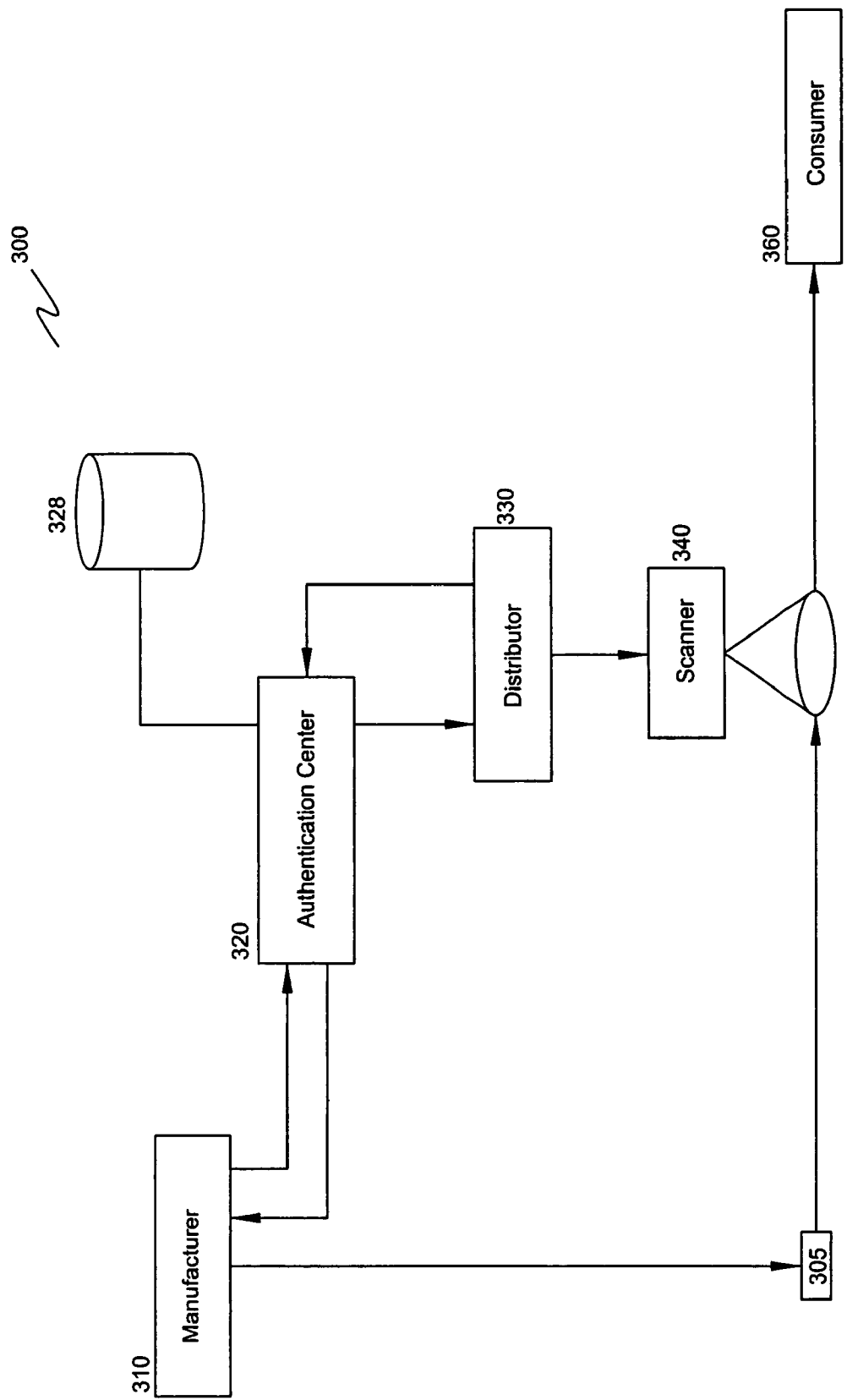
FIG. 3 is a schematic representation of an authentication system according to one embodiment of the disclosure.

FIG. 3 is a schematic representation of an authentication system according to one embodiment of the disclosure. Among others, system 300 of FIG. 3 shows manufacturer 310, authentication center 320 and distribution center 330. In an exemplary embodiment, manufacturer 310 requests authentication instructions from authentication center 320 concerning product 305. The request may include the manufacturer's name, product information, production date, expiration date, etc. Authentication center 320 may be at a remote location and independent from manufacturer 310 and/or distributor 330. Product 305 may be a variety of objects such as, but not limited to, pharmaceuticals, chemicals, biological material, food, food additives, spices, cosmetics, perfumes, paper money, coins, credit cards, digital video discs, compact discs, audio tapes, video tapes, electronic devices or works of art. Other examples of product 305 may be an item or object to be used for identification purposes for a person or animal. Furthermore, the authentication system described above may be used for placing an identification device directly on an animal or person (obviously, the "manufacturer" would not be manufacturing the animal or person, but would simply be a location for writing/applying the identification device on the animal or person).

Authentication center 320 may respond to the manufacturer's request by providing information for applying one or more identifying marks and their attributes for product 305. The attributes of the identifying mark may define its physical characteristics, including: shape, size, dimensionality, material, spectral fingerprint, and one or more encryption features.

In one embodiment, manufacturer 310 determines the first portion of the identifying mark and communicates the same to authentication center 320. The authentication center 320 then responds by providing attributes of the encrypted portions of the mark. The encrypted portion may be incorporated in the identifying mark or it may define a secondary identifying mark. The encrypted portion may be defined by a 1D, 2D or a 3D barcode, or some combination thereof, and may be invisible in the visual wavelength range. Further, the encrypted portion may comprise one or more of the fluorescent material and/or a Raman-scattering material. The encrypted feature may include a fluorescent material having a first spectral fingerprint at a first location of product 305 and a second spectral fingerprint at a second location of product 305. In an alternative embodiment, the encrypted feature may include a Raman-scattering material having a first spectral fingerprint at a first location of product 305 and a second spectral fingerprint at a second location of product 305. Using the authentication information, manufacturer 310 can place the identifying mark on product 305. Authentication center 320 may also store authentication information at database 328 for future reference.

Distributor 330 can be a point-of-service facility such as a pharmacy, hospital, clinic or any other facility which dispenses product 305 to the consumer. Alternatively, distributor 330 can be a facility whereby a consumer having acquired product 305 can verify its authenticity. To test the authenticity of product 305, distributor 330 may include scanner 340. Scanner 340 may include conventional barcode scanners or similar devices suitably modified to identify encrypted features according to the teachings of the present disclosure. Scanner 340 may be configured to read the identifying mark of product 305. Scanner 340 may also be configured to identify the encrypted features included in the identifying mark of product 305 once its spectral fingerprint is disclosed to scanner 340.

To decode the encrypted portions of product 305, distributor 330 may request information from authentication center 320 by sending to the authentication center certain identifying information read by scanner 340. For example, the scanner may read the first portion of the identifying mark on the product 350 and send that information to the authentication center. The authentication center may query the database 328 to extract decoding information associated with the information received from the scanner's reading of the first portion of the identifying mark. Decoding information may include information such as the spectral fingerprint of the encrypted portions of product 305. Decoding information may also include coordinate or orientation information describing the location of any other encryption mark on product 305 or its packaging. These and other authentication information can be communicated to the distributor 330 and/or the scanner 340.

Using the authentication information, scanner 340 may read encrypted information on product 305. Alternatively, if scanner 340 is not configured to operate at the desired wavelength, a different scanner may be tuned to read the encrypted portions of the identifying mark. Once read, the encrypted information can be either communicated back to the authentication center 320 for verification or it may be verified at scanner 340 or distributor center 330. If product 305 is authentic, it may be released to the consumer 360. If authentication fails, product 305 may be removed from circulation.

Figure 4:
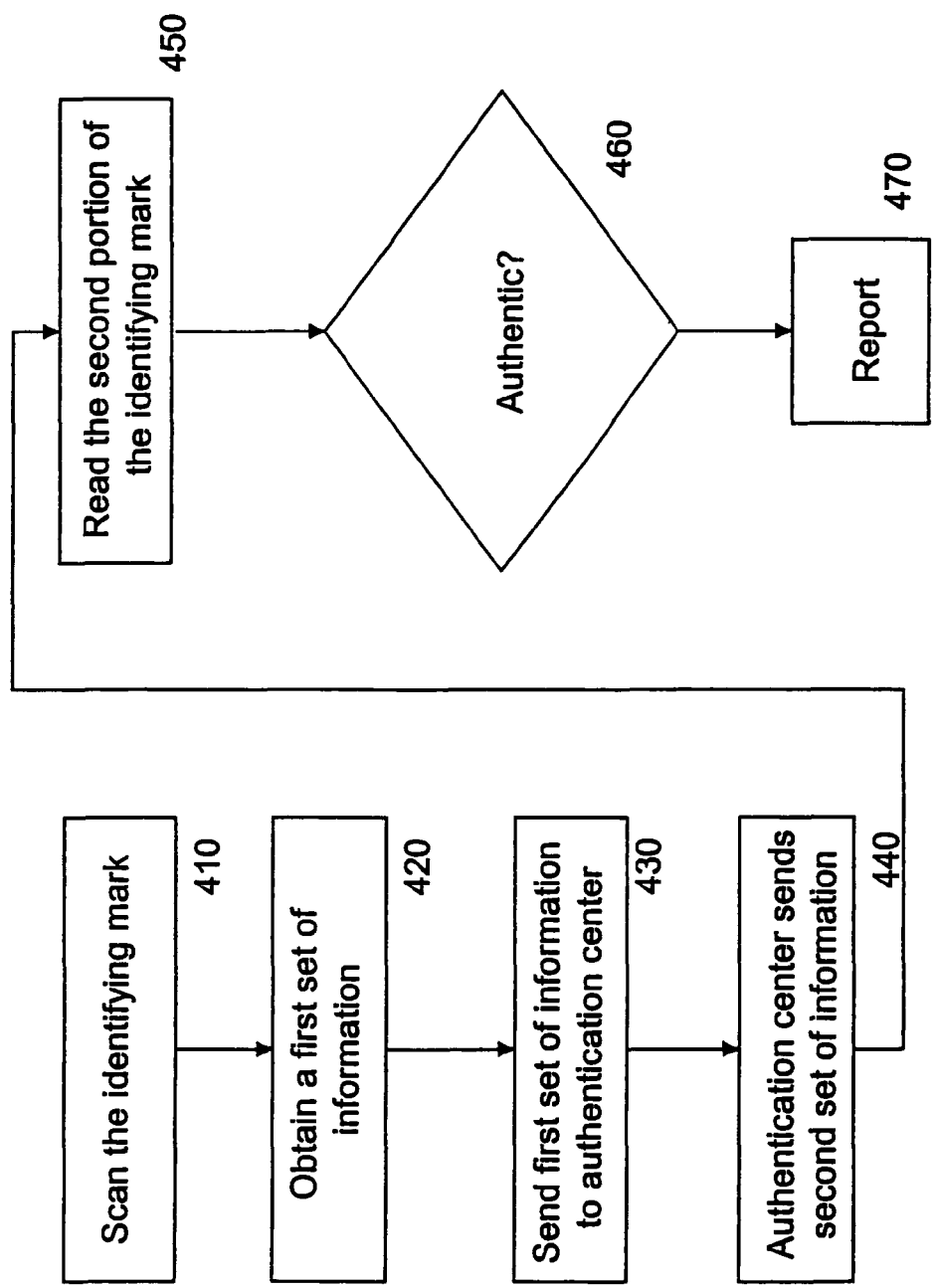
FIG. 4 is a flow diagram showing an authentication process according to one embodiment of the disclosure.

FIG. 4 is a flow-diagram showing an authentication process according to one embodiment of the disclosure. In step 410, a scanner reads an identifying mark or at least a first portion thereof. The identifying mark may be located on the product, on the packaging for the product, or both. The identifying mark can comprise a barcode having a first portion and a second portion. The first portion can be readily detected by the scanner using, for example, conventional means (e.g., initial optical scanning of the product or its package). The second portion may be encrypted such that its detection or its decoding would require additional information. Thus, the scanner may read the first portion of the identifying mark at step 420 to obtain a first set of information. In step 430, the first set of information is communicated to an authentication center (e.g., the authentication center 320 in FIG. 3). In one embodiment, the scanner transmits the first set of information wirelessly to the authentication center and receives instructions from the authentication center wirelessly.

The authentication center can comprise the product manufacturer or, preferably, an independent authentication center. Upon receiving the first set of information, in step 440, the authentication center transmits a second set of information to the scanner. The second set of information may include spectral fingerprint(s) or other decoding information for reading the second portion of the identifying mark. The second set of information may also include coordinate information for locating the second portion of the identifying mark. Using the second set of information, the scanner identifies and reads the second portion of the identifying mark in step 450. In step 460, a determination is made for the authenticity of the product. The determination is preferably made at a remote location (e.g., based on the information received from the scanner upon its performing the reading operation at step 450) and communicated to the point of service, although the determination may be made at the point of service (however this latter option may require additional security measures such that theft of the scanner does not allow the thief to decode or decrypt the identifying mark). Finally, in step 470, the results of the authentication inquiry can be displayed.

The readers/reading devices may include software and/or hardware that makes the reader secure so that if the reader is removed, misplaced, or stolen (i.e., a "suspect reader"), the authentication center will be aware of the status of the reader and be able to alert a person at the authentication center and/or disable the reader automatically. The authentication center may no longer accept input from a suspect reader thereby eliminating the possibility of a hacker gaining access to the authentication center's database and/or information by reverse engineering a reader.

Figure 5:
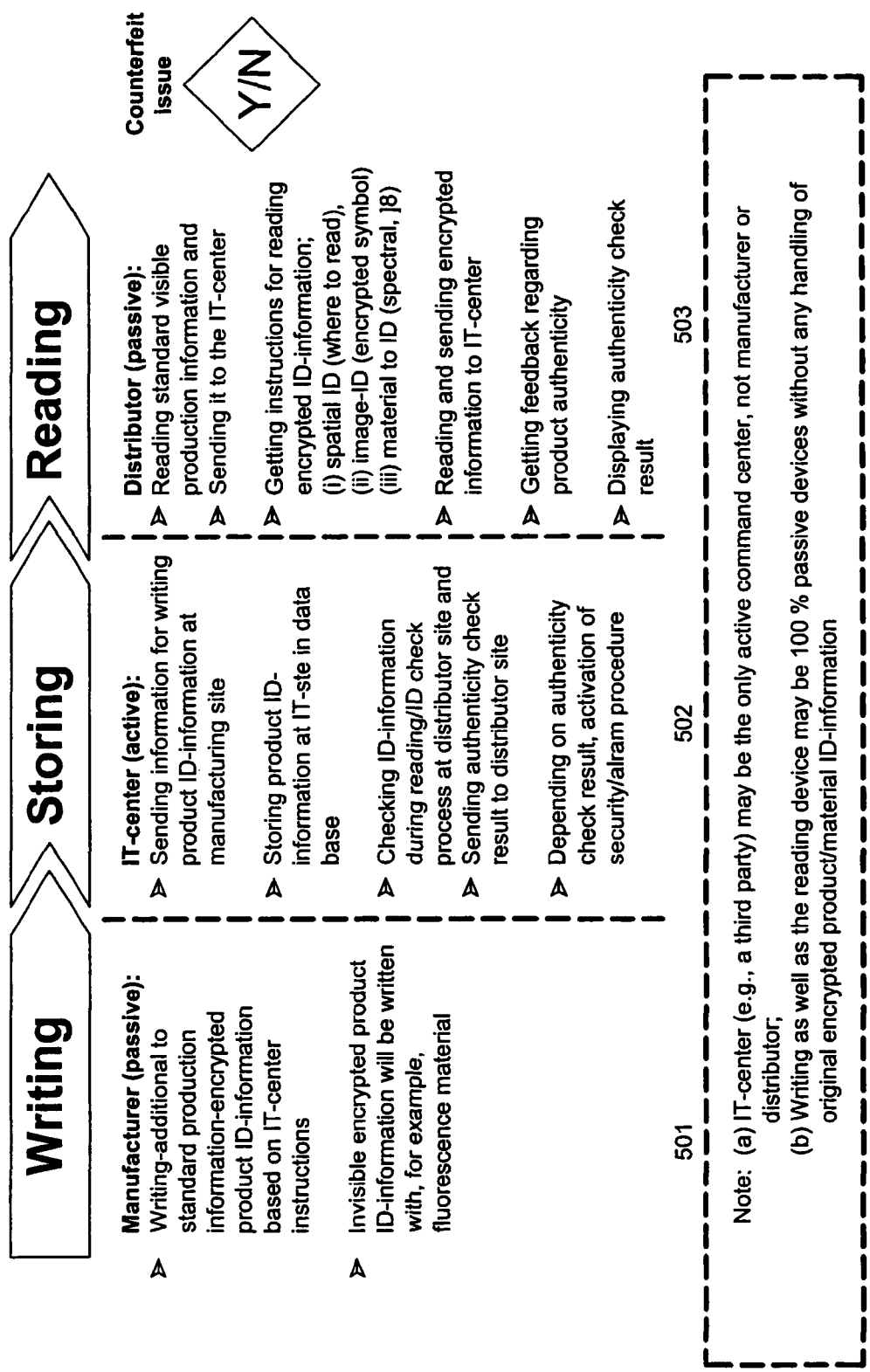
FIG. 5 is an overview of the actions/responsibilities of the entities in an anticounterfeiting system according to one embodiment of the disclosure.

FIG. 5 is an overview of the actions/responsibilities of the entities in an anticounterfeiting system according to one embodiment of the disclosure. As described above, a manufacturing entity or writing device 501 may perform the attaching of an identifying mark (which may contain an encrypted feature) to an object (product, material, etc.) under the instruction and/or control of a control/information/authentication center, sometimes referred to herein as an Information Technology ("IT") center 502. A distributor or reading device 503 may perform the function of reading the identifying mark attached to the object. In an alternative embodiment, the reading device 503 may be more than one device: one reading device for reading the encrypted feature of the identifying mark and another reading device for reading the non-encrypted features (of the identifying mark as well as other non-encrypted features of the object). Preferably, the manufacturer 501 and the distributor 503 are "passive" while the IT center 502 is "active", i.e., only the IT center has knowledge of the encrypted feature while the manufacturing entity/writing device 502 and the distributor/reading device 502 are merely conduits for writing/reading information, respectively without any storage of secret encryption information (which is only possessed by the IT center) and without any "intelligence" to actively perform any authentication verification operation locally (i.e., without IT center's support). For example, the reading device 503 may be a simple conduit of information to/from the IT center, with the IT center providing all instructions to the reader device (e.g., as to which encrypted spectral fingerprint to measure at what location within the barcode, etc.) and making all authenticity verification decisions based on the information received from the reading device. Because of such a passive role of the reading device, it may not be risky to make such reading devices publicly available as discussed hereinabove. In one embodiment, the 2D/3D barcode reader may include circuits/components (e.g., a laser scanner and a liquid crystal tunable filter ("LCTF") for wavelength discrimination) capable of "reading" the barcode as well as identifying the IT center-instructed spectral signature of the invisible fluorescent encryption material.

An invisible, encrypted product-ID may be embedded or written on each product/package to be protected. The writing of such product/material/object-ID may be under the control of an active Information Technology ("IT") center that can determine the timing, placement/location, shape, and content of various such invisible ID's to be used during such product "marking". In one embodiment, such product-ID may be made of a fluorescent material having a predetermined spectral fingerprint (as determined by the IT center). The fluorescent material and/or fingerprints may change from one product batch to another or even from one product to another in the same package as may be dynamically determined by the IT center during product manufacturing and/or packaging. The IT center may perform time-based changing of product/material-ID in a fully random fashion, in a quasi-random fashion, or according to a predetermined method (e.g., serially, as a function of a predetermined algorithm, etc.) In one embodiment, the shape of the identification symbol (for product/material-ID) may be in the form of a two-dimensional ("2D") barcode or data matrix, which contains an invisible encryption portion for anticounterfeiting. Various suitable shapes, (e.g., squares, rectangles, polygons, etc.) of varying sizes may be selected for the 2D barcodes as determined by the IT center. The portion of the 2D barcode not containing such encryption may be printed either visibly or invisibly on the surface of the product/package. However, an invisible printing of the entire barcode may be preferred for additional protection. It is noted here that the two dimensional array of the barcode may function as a reference frame for a coordinate system that may facilitate barcode detection in an orientation-independent manner—i.e., without dependence on a specific orientation of the product/package containing the bar code. In other words, during detection, the product/package may not have to be oriented in a specific direction to enable barcode detection.

The size, shape, placement, and spectral signature of the encryption portion may be determined by the IT center. Similarly, the shapes and placement of the bars constituting the non-fluorescent portion of the 2D barcodes may also be determined by the IT center for added security. The 2D barcodes may contain information including, for example, the timing of their printing, the associated product batch number, the type/name of the product, the expiration date (if any) of the product and its ingredients, etc. All such information may also be stored in the IT center for future retrieval when needed (e.g., for product/package verification in the field or at a retail store).

Conventionally available 2D or 3D barcode readers may be suitably modified (e.g., to detect the IT center-mandated spectral signature in the encrypted invisible portion) to read the 2D or 3D barcodes according to the teachings of the present disclosure.

It is observed here that if a counterfeiter were to copy the 2D barcode, for example, the counterfeiter may not know the exact spectral signature, location, and shape of the fluorescent encryption portion because only the IT center may know of the specific spectral wavelength, location, shape, or other attribute and/or parameter that is registered in its database as representing the spectral fingerprint of the fluorescent portion. The authentication verification may be a two step procedure: (1) the reader first registering the product/production standard information with the third-party IT center (and the IT center establishing this initial product ID match), and (2) the IT center then identifying the linked encryption and sending appropriate reading instructions to the reader for a second reading operation (i.e., the reading of the invisible encrypted product or material ID). If the reader-detected encryption information matches the stored encryption information (associated with the product ID read in the first reading operation) in the IT center, then the reader may get an "OK" or "valid" signal indicating an authentic product/package. However, if there is no match at this second level of checking, then an early warning signal may be sent to the reader to indicate the presence of a possible counterfeit product/package. Therefore, when a counterfeiter copies the barcode, the copied barcode will be without the necessary encryption, thereby immediately signaling an authentication failure.

In an alternative embodiment, a three dimensional ("3D") barcode may be used instead of a 2D version for additional security and information storage. It is observed that a 3D barcode may contain significantly more information than a 2D barcode because of the availability of many more variables for manipulation in a 3D representation. Various parameters and/or attributes of a 3D barcode may be varied to accomplish unique coding. Such parameters and attributes may include, for example, any of the x, y, or z dimensions of a cube, rectangular block, or other geometric shape, the spacing between two blocks, the number of blocks, the number of x, y, or z columns of the entire structure, the thickness (i.e., depth) of a block, etc. An exemplary placement of encrypted invisible blocks is also illustrated in the 3D barcode embodiment of FIG. 1C.

Various methods may be used to write the 3D barcodes including, for example, photolithography, two-photon writing method, inkjet printing, embossing, engraving, stamping, etc. Depending on the method of writing, the bars may be applied to the surface of the product/package or the surface may be suitably deformed to create the bars. In the case of inkjet printing, wells of inks of different compounds (some fluorescent for an invisible encryption portion) of fast-drying material may be used to write the barcode in a 3D form using a layer-by-layer approach. In one embodiment, a reader of such 3D barcode may employ confocal imaging to obtain the depth information in addition to the length and width information for the blocks constituting the 3D barcode. In another embodiment, the reader may include a displacement sensor or charge-coupled device ("CCD") sensor with, for example, a laser as an illumination source. An ultrasonic distance measuring device may also be employed in the 3D barcode reader unit. It is preferable that a 3D barcode reader be capable of distinguishing various raised bars (with and without spacing between two adjacent bars) and also distinguishing between bars of different height/width/depth.

As in the case of the 2D barcode, the IT center may instruct the product manufacturer or bar code writing device what and how to write the 3D barcode with the invisible encryption material on the product itself and/or the package. The IT center may also store the written information and link it with the production- or product-related information to assist in future authentication of the product/package as was the case in the embodiment with 2D barcodes. In case of writing 2D or 3D barcodes directly on a medical, pharmaceutical, or food product, it may be desirable to obtain necessary approvals from appropriate state and federal public health authorities, such as the U.S. Food and Drug Administration ("FDA"). The authentication verification process for products/packages with 3D barcodes may also be a two-step process similar to that discussed hereinbefore for the 2D barcodes.

The readers for the 2D and/or 3D barcodes according to the teachings of the present disclosure may be in the form of hand-held/portable readers or in the form of stationary readers. In one embodiment, a retail pharmacy store may provide a free drug authentication checking service to its patrons whenever a patron decides to determine authenticity of a drug. Such situations may arise, for example, when the patron has bought the drug online over the Internet and would like to make sure that the purchased drug is authentic. Such an on-demand drug authentication checking service by the retail pharmacy store may be part of a goodwill gesture to its patrons and also to generate more business for its own retail drug division if the customer finds out that the internet-purchased drug is not authentic. As part of such a typically free service, the pharmacy store may provide a hand-held reader to the patron for authentication verification in a do-it-yourself manner. Alternatively, the pharmacy store may place a stationary "booth" or kiosk (e.g., similar to typical free blood-pressure monitoring units in pharmacy stores) containing a 2D/3D barcode reader capable of synchronizing with the IT center (e.g., through a secure internet connection) and reading the 2D or 3D barcodes printed on products and/or packaging according to the teachings of the present disclosure. Again, the authentication verification using this kiosk may also be in a do-it-yourself manner, but patrons needing assistance with the operation of the kiosk may be provided appropriate help by the pharmacy personnel as a goodwill gesture. The kiosk may be placed at a location near the pharmacy dispatch counter allowing the patron to access the pharmacist on duty with any questions and also to assist the patron in choosing the right product in case the patron's product turns out to be counterfeit. Other business establishments (e.g., a mall, a sporting goods store, a specialty clothing store, a bank, etc.) may also offer such free on-demand authentication for relevant products of interest (e.g., jewelry, precious stones, premium watches, sporting goods, specialty line of clothing, money, financial instruments, etc.) so as to attract patrons into the establishment and to offer them additional product selections. A fee-based service providing product authentication according to the teachings of the present disclosure may be offered by a business establishment if so desired.

Figure 6:
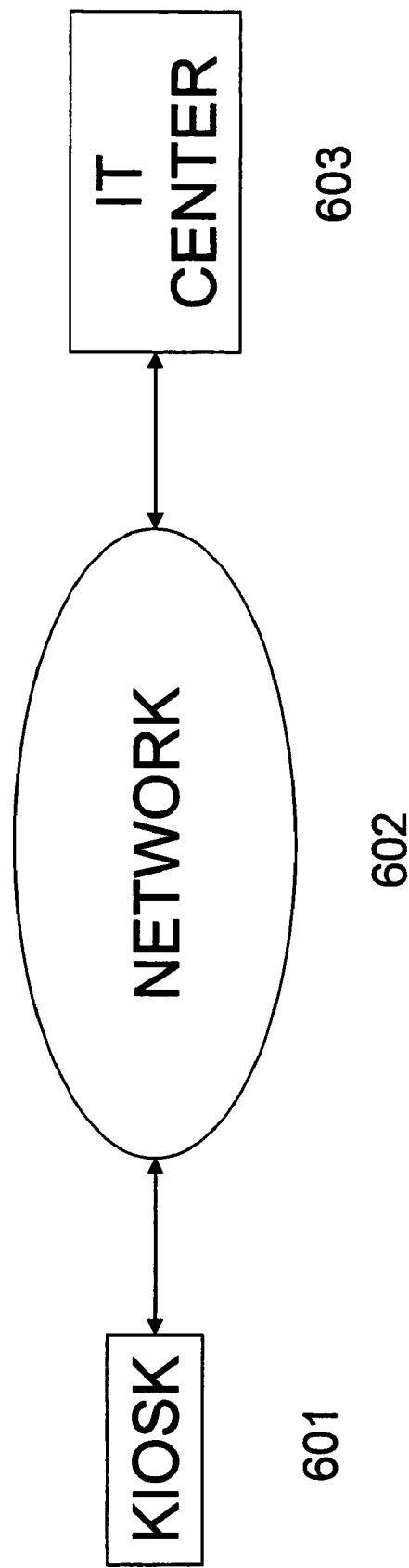
FIG. 6 is a block diagram of an embodiment of the disclosure.

FIG. 6 shows a block diagram of an overview of a system according to an embodiment of the disclosure. The kiosk 601 may be a strand-alone kiosk, for example in a shopping mall, or it may be an integral part of a distribution point for a product, such as a pharmacy. The kiosk may be connected to an IT Center 603 via a network 602 such as the internet. The kiosk preferably includes a reader, more preferably a passive reader, as described herein. As discussed above, information flows between the kiosk and the IT Center via the network. The kiosk reader may have a security system or security protocols so that the IT Center can be assured that the reader and/or kiosk (if an integral unit) is authentic and not a hacker attempting to gain access to the IT Center. A user of the kiosk may be charged a fee to determine if a product is authentic. The authentication procedure may include an authentication procedure discussed herein.

Figure 7:
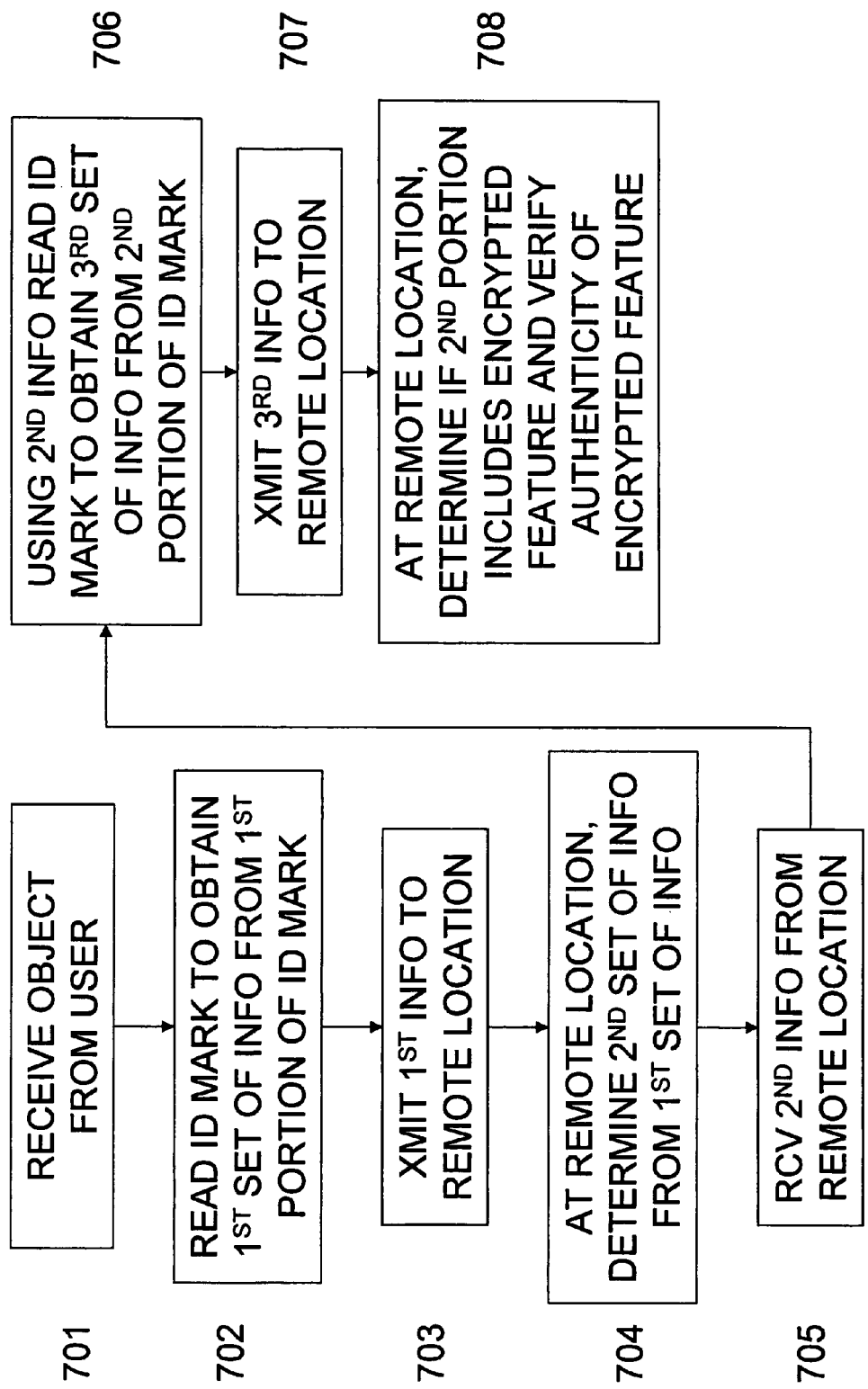
FIG. 7 is a flow diagram of an embodiment of the disclosure.

FIG. 7 is a flow diagram according to an embodiment of the disclosure. At block 701, an object is received from a user for the determination of the authenticity of the product. At block 702, an identifying mark or an identification mark may be read by a reader device to thereby obtain a first set of information. The reader device may be located at a distribution point for the product. This first set of information may be obtained from a first portion of the identifying mark or it may be obtained from another mark on the product. At block 703, the first information is transmitted to a remote location, such as an IT Center as described herein. At block 704, at the remote location a second set of information may be determined from the received first set of information. As a non-limiting example, the remote location may use the first set of information to access a look-up table or as input to an algorithm to thereby determine the second set of information. At block 705, the second set of information is transmitted by the remote location and received by the reader device. At block 706, the reader device uses the second set of information to obtain a third set of information from a second portion of the identifying mark or from a separate mark on the product and/or the packaging therefor. At block 707, the reader device transmits the third set of information to the remote location. At block 708, the remote location receives the third set of information and using the third set of information determines if the second portion of the identifying mark, for example, includes an encrypted feature and then verifies the authenticity of the encrypted feature. Optionally, and not shown in FIG. 7, the remote location may send a signal to the reader device indicating the authenticity or lack thereof of the product.

The above description is not intended and should not be construed to be limited to the examples given but should be granted the full breadth of protection afforded by the appended claims and equivalents thereto. Although the disclosure is described using illustrative embodiments provided herein, it should be understood that the principles of the disclosure are not limited thereto and may include modification thereto and permutations thereof.

The invention claimed is:

1. A method for providing counterfeiting protection for an object, comprising the steps of:
   (a) accessing the object including an identifying mark having a first portion and a second portion wherein said second portion includes an encrypted feature;
   (b) reading the first portion to thereby obtain a first set of information;
   (c) transmitting the first set of information to a remote location;
   (d) receiving from the remote location a second set of information; and
   (e) reading the second portion using the second set of information, wherein said reading of the second portion includes forming an image of at least a part of said second portion to thereby determine the authenticity of the object, wherein said image is such that it provides for high spectral resolution and high spatial definition.

2. The method of claim 1 wherein a composition of the second portion includes a parameter that is a function of at least one of: a location of the second portion on the object, an orientation of the second portion on the object, and an attribute of the second portion.

3. The method of claim 2 wherein the attribute is chosen from the group consisting of: shape, size, dimensionality, material, spectral fingerprint, and encrypted feature.

4. The method of claim 1 wherein the step of reading the second portion comprises the steps of:
   (e)(i) reading the second portion using the second set of information to thereby obtain a third set of information;
   (e)(ii) transmitting the third set of information to the remote location; and
   (e)(iii) receiving from the remote location an indication of the authenticity of the object.

5. The method of claim 1 wherein one of the first and second portions is affixed to a package for the object.

6. The method of claim 1 wherein a dimension for one of the first and second portions is approximately one micrometer.

7. The method of claim 1 wherein the first portion includes at least one of: object name, object type, object batch number, location of manufacture, date of manufacture, time of manufacture, date of expiration, and at least one of the object ingredients.

8. The method of claim 1 wherein the second portion includes at least one of a fluorescent material and a Raman-scattering material.

9. The method of claim 8 wherein the determination of authenticity is a function of at least one of: wavelength of emission from the fluorescent material, a wavelength of the Raman-scattering from the Raman-scattering material, and intensity of emission from the fluorescent material, an intensity of the Raman-scattering from the Raman-scattering material, a chemical image of the second portion, and combinations thereof.

10. The method of claim 1 wherein the second portion is invisible in the visual wavelength range.

11. The method of claim 1 wherein the second portion includes a two-dimensional barcode.

12. The method of claim 1 wherein the second portion includes a three-dimensional barcode.

13. The method of claim 12 wherein the three-dimensional barcode is affixed by a method chosen from the group consisting of: photolithography, two-photon writing, inkjet printing, embossing, engraving, and stamping.

14. The method of claim 1 wherein the second portion comprises a fluorescent material having a first spectral fingerprint at a first location within the second portion and a second spectral fingerprint at a second location within the second portion.

15. The method of claim 1 wherein the second portion comprises a first fluorescent material having a first spectral fingerprint and a second fluorescent material having a second spectral fingerprint.

16. The method of claim 1 wherein the second portion comprises a Raman-scattering material having a first spectral fingerprint at a first location within the second portion and a second spectral fingerprint at a second location within the second portion.

17. The method of claim 1 wherein the second portion comprises a first Raman-scattering material having a first spectral fingerprint and a second Raman-scattering material having a second spectral fingerprint.

18. The method of claim 1 wherein the second portion comprises a Raman-scattering material having a first spectral fingerprint and a fluorescent material having a second spectral fingerprint.

19. The method of claim 1 wherein the object is chosen from the group consisting of: pharmaceuticals, chemicals, biological material, food, food additives, spices, cosmetics, perfumes, paper money, coins, credit cards, digital video discs, compact discs, audio tapes, video tapes, electronic devices, and works of art.

20. The method of claim 1 wherein the step of reading the second portion includes illuminating the second portion with photons of a predetermined wavelength.

21. The method of claim 20 wherein the predetermined wavelength is in a range of wavelengths consisting of: near infrared light, infrared light, visible light, ultraviolet light.

22. The method of claim 20 wherein the illuminating photons are from a laser.

23. The method of claim 1 wherein steps (c) and (d) are replaced with:

(c)(i) transmitting the first set of information to a remote location;
(c)(ii) receiving the first set of information at said remote location;
(c)(iii) determining at said remote location a second set of information based on the received first set of information;
(c)(iv) transmitting the second set of information from the remote location; and
(d) receiving from the remote location the second set of information.

24. A method comprising:
(a) providing to a user an item with an identifying mark affixed thereto, wherein said identifying mark has a first portion and a second portion and wherein said second portion includes an encrypted feature; and
(b) instructing said user to perform the following after receiving said item:
  (i) read the first portion to thereby obtain a first set of information;
  (ii) transmit the first set of information to a remote location;
  (iii) receive from the remote location a second set of information; and
  (iv) read the second portion using the second set of information, wherein said reading of the second portion includes forming an image of at least a part of said second portion to thereby determine the authenticity of the object, wherein said image is such that it provides for high spectral resolution and high spatial definition.

25. A method for determining authenticity of an object comprising:
reading a first portion of an identifying mark on the object to thereby obtain a first set of information;
transmitting the first set of information to a remote location;
determining at the remote location a second set of information based on the received first set of information;
receiving from the remote location the second set of information;
reading a second portion of the identifying mark using the second set of information, wherein said reading of the second portion includes forming an image of at least a part of said second portion, wherein said image is such that it provides for high spectral resolution and high spatial definition;
indicating a lack of authenticity of the object upon the occurrence of one or more of the following: an absence of said first portion on said object, an absence of said second portion on said object, or an absence of a feature encrypted according to a predetermined encryption method on said object; and
indicating authenticity of the object upon the occurrence of all the following: a determination that said first portion is on said object, a determination that said second portion is on said object, and the determination that said feature encrypted according to the predetermined encryption method is on said object.

26. The method of claim 25 wherein one of the first and second portions is affixed to a package for the object.

27. The method of claim 25 wherein a dimension for one of the first or second portions is approximately one micrometer.

28. The method of claim 25 wherein the first portion includes at least one of: object name, object type, object batch number, location of manufacture, data of manufacture, time of manufacture, date of expiration, and at least one of the object ingredients.

29. The method of claim 25 wherein the second portion includes at least one of a fluorescent material and a Raman-scattering material.

30. The method of claim 29 wherein the step of indicating authenticity includes a determination of at least one of: a wavelength of emission from the fluorescent material, a wavelength of the Raman-scattering from the Raman-scattering material, an intensity of emission from the fluorescent material, an intensity of the Raman-scattering from the Raman-scattering material, a chemical image of the second portion, and combinations thereof.

31. The method of claim 25 wherein the second portion is invisible in the visual wavelength range.

32. The method of claim 25 wherein the feature includes a two-dimensional barcode.

33. The method of claim 25 wherein the feature includes a three-dimensional barcode.

34. The method of claim 33 wherein the three-dimensional barcode is affixed by a method chosen from the group consisting of: photolithography, two-photon writing, inkjet printing, embossing, engraving, and stamping.

35. The method of claim 25 wherein the reading of said second portion of the identifying mark using said second set of information includes:
 determining if said second portion comprises a fluorescent material having a first spectral fingerprint at a first location within said second portion; and
 determining if said second portion comprises a fluorescent material having a second spectral fingerprint at a second location within said second portion.

36. The method of claim 25 wherein the reading of said second portion of the identifying mark using said second set of information includes:
 determining if said second portion comprises a first fluorescent material having a first spectral fingerprint; and
 determining if said second portion comprises a second fluorescent material having a second spectral fingerprint.

37. The method of claim 25 wherein the reading of said second portion of the identifying mark using said second set of information includes:
 determining if said second portion comprises a Raman-scattering material having a first spectral fingerprint at a first location within said second portion; and
 determining if said second portion comprises a second spectral fingerprint at a second location within said second portion.

38. The method of claim 25 wherein the reading of said second portion of the identifying mark using said second set of information includes:
 determining if said second portion comprises a first Raman-scattering material having a first spectral fingerprint; and
 determining if said second portion comprises a second Raman-scattering material having a second spectral fingerprint.

39. The method of claim 25 wherein the reading of said second portion of the identifying mark using said second set of information includes:
 determining if said second portion comprises a Raman-scattering material having a first spectral fingerprint; and
 determining if said second portion comprises a fluorescent material having a second spectral fingerprint.

40. The method of claim 25 wherein the object is selected from the group consisting of: pharmaceuticals, chemicals, biological material, food, food additives, spices, cosmetics, perfumes, paper money, coins, credit cards, digital video discs, compact discs, audio tapes, video tapes, electronic devices, and works of art.

41. The method of claim 25 wherein the step of reading said second portion of the identifying mark using said second set of information includes illuminating said second portion with photons of a predetermined wavelength.

42. The method of claim 41 wherein the predetermined wavelength is in a range of wavelengths consisting of: near infrared light, infrared light, visible light, and ultraviolet light.

43. The method of claim 41 wherein the illuminating photons are from a laser.

44. The method of claim 25 further comprising charging a fee for determining authenticity of said object.

45. A method for providing counterfeiting protection for an object, comprising the steps of:
 (a) accessing the object including an identifying mark having a first portion and a second portion wherein said second portion includes an encrypted feature, wherein said encrypted feature comprises a Raman-scattering material;
 (b) reading the first portion to thereby obtain a first set of information;
 (c) transmitting the first set of information to a remote location;
 (d) receiving from the remote location a second set of information; and
 (e) reading the second portion using the second set of information, wherein said reading of the second portion includes forming an image of at least a part of said second portion to thereby determine the authenticity of the object, wherein said image is such that it provides for high spectral resolution and high spatial definition.

46. The method of claim 45 wherein the determination of authenticity is a function of at least one of: a wavelength of the Raman-scattering from the Raman-scattering material, intensity of the Raman-scattering from the Raman-scattering material, a chemical image of the second portion, and combinations thereof.

47. The method of claim 45 wherein the second portion comprises a Raman-scattering material having a first spectral fingerprint at a first location within the second portion and a second spectral fingerprint at a second location within the second portion.

48. The method of claim 45 wherein the second portion comprises a first Raman-scattering material having a first spectral fingerprint and a second Raman-scattering material having a second spectral fingerprint.

49. A method for determining authenticity of an object comprising:
 reading a first portion of an identifying mark on the object to thereby obtain a first set of information;
 transmitting the first set of information to a remote location;
 determining at the remote location a second set of information based on the received first set of information;
 receiving from the remote location the second set of information;
 reading a second portion of the identifying mark using the second set of information, wherein
 said second portion comprises a Raman-scattering material, and wherein said reading of the second portion includes forming an image of at least a part of said second portion, wherein said image is such that it provides for high spectral resolution and high spatial definition;

indicating a lack of authenticity of the object upon the occurrence of one or more of the following: an absence of said first portion on said object, an absence of said second portion on said object, or an absence of a feature encrypted according to a predetermined encryption method on said object; and indicating authenticity of the object upon the occurrence of all of the following: a determination that said first portion is on said object, a determination that said second portion is on said object, and the determination that said feature encrypted according to the predetermined encryption method is on said object.

50. The method of claim 49 wherein the step of indicating authenticity includes a determination of at least one of: a wavelength of the Raman-scattering from the Raman-scattering material, an intensity of the Raman-scattering from the Raman-scattering material, a chemical image of the second portion, and combinations thereof.

* * * * *